(12) United States Patent
Ferreira Costa et al.

(10) Patent No.: US 11,886,409 B1
(45) Date of Patent: Jan. 30, 2024

(54) SEARCHABLE CATALOG OF COLUMNAR NUMERICAL DATA

(71) Applicant: SAP SE, Walldorf (DE)

(72) Inventors: Guilherme Ehrhardt S. Ferreira Costa, Lisbon (PT); Jan Portisch, Bruchsal (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/886,012

(22) Filed: Aug. 11, 2022

(51) Int. Cl.
*G06F 16/22* (2019.01)
(52) U.S. Cl.
CPC ........ *G06F 16/221* (2019.01); *G06F 16/2228* (2019.01); *G06F 16/2272* (2019.01)
(58) Field of Classification Search
CPC ............... G06F 16/221; G06F 16/2272; G06F 16/2282; G06F 16/24
See application file for complete search history.

(56) References Cited

U.S. PATENT DOCUMENTS

| | | | | |
|---|---|---|---|---|
| 9,846,567 | B2* | 12/2017 | Kaushik | G06F 16/221 |
| 10,417,251 | B2* | 9/2019 | Willson | G06F 16/211 |
| 11,558,067 | B2* | 1/2023 | Shi | G06F 16/221 |
| 2009/0171999 | A1* | 7/2009 | McColl | G06F 16/2465 |
| 2017/0116171 | A1* | 4/2017 | Villard, Jr. | G06F 40/18 |

* cited by examiner

*Primary Examiner* — Merilyn P Nguyen
(74) *Attorney, Agent, or Firm* — Buckley, Maschoff & Talwalkar LLC

(57) ABSTRACT

Systems and methods provide identification of a first configuration specifying a first column of a first data source, acquisition, based on the first configuration, of a first sequence of values stored in consecutive rows of the first column, and storage of the first sequence of values in a storage device in association with an identifier of the first data source and the first column.

9 Claims, 14 Drawing Sheets

| STORE | PRODUCT | DATE | SALES_QT | STOCK_QT | LOG_FORE | MISS_SALE |
|---|---|---|---|---|---|---|
| 2297 | 10005 | 09/09/2015 | 0 | 4 | 9 | TRUE |
| 2297 | 10005 | 10/09/2015 | 0 | 4 | 9 | TRUE |
| 2297 | 10005 | 11/09/2015 | 0 | 10 | 9 | TRUE |
| 2297 | 10005 | 12/09/2015 | 0 | 10 | 9 | TRUE |
| 2297 | 10005 | 14/09/2015 | 0 | 10 | 9 | TRUE |
| 2297 | 10005 | 15/09/2015 | 0 | 10 | 9 | TRUE |
| 2297 | 10005 | 16/09/2015 | 0 | 10 | 9 | TRUE |
| 2297 | 10005 | 17/09/2015 | 0 | 10 | 9 | TRUE |
| 2297 | 10005 | 18/09/2015 | 0 | 10 | 9 | TRUE |
| 2297 | 10005 | 19/09/2015 | 1 | 10 | 9 | FALSE |
| 2297 | 10005 | 21/09/2015 | 0 | 9 | 9 | TRUE |
| 2297 | 10005 | 22/09/2015 | 0 | 9 | 9 | TRUE |
| 2297 | 10005 | 23/09/2015 | 1 | 3 | 9 | FALSE |
| 2297 | 10005 | 24/09/2015 | 0 | 2 | 9 | TRUE |
| 2297 | 10005 | 25/09/2015 | 0 | 8 | 9 | TRUE |
| 2297 | 10005 | 26/09/2015 | 1 | 8 | 9 | FALSE |
| 2297 | 10005 | 28/09/2015 | 0 | 7 | 9 | TRUE |
| 2297 | 10005 | 29/09/2015 | 0 | 7 | 9 | TRUE |
| 2297 | 10005 | 30/09/2015 | 0 | 7 | 9 | TRUE |
| 2297 | 10005 | 01/10/2015 | 0 | 7 | 9 | TRUE |
| 2297 | 10005 | 02/10/2015 | 1 | 7 | 9 | FALSE |
| 2297 | 10005 | 03/10/2015 | 0 | 6 | 9 | TRUE |

| STORE | PRODUCT | DATE | SALES_QTY |
|---|---|---|---|
| 2297 | 10005 | 19/01/2015 | 1 |
| 2297 | 10005 | 20/01/2015 | 4 |
| 2297 | 10005 | 21/01/2015 | 0 |
| 2297 | 10005 | 23/01/2015 | 8 |
| 2297 | 10005 | 24/01/2015 | 8 |
| 2297 | 10005 | 26/01/2015 | -2 |
| 2297 | 10005 | 27/01/2015 | 9 |
| 2297 | 10005 | 28/01/2015 | 1 |
| 2297 | 10005 | 29/01/2015 | 2 |
| 2297 | 10005 | 30/01/2015 | 4 |

| STORE | PRODUCT | DATE | SALES_QTY |
|---|---|---|---|
| 2297 | 211116 | 19/01/2015 | 72 |
| 2297 | 211116 | 20/01/2015 | 12 |
| 2297 | 211116 | 21/01/2015 | 4 |
| 2297 | 211116 | 23/01/2015 | 246 |
| 2297 | 211116 | 24/01/2015 | 53 |
| 2297 | 211116 | 26/01/2015 | 25 |
| 2297 | 211116 | 27/01/2015 | 6 |
| 2297 | 211116 | 28/01/2015 | 7 |
| 2297 | 211116 | 29/01/2015 | -1 |
| 2297 | 211116 | 30/01/2015 | 9 |

*FIG. 10B*

SEARCHABLE CATALOG OF COLUMNAR NUMERICAL DATA

BACKGROUND

Modern enterprises produce, use and store large amounts of numerical data. The data may be stored in database tables, files or other data structures. Users interact with applications executing on servers (e.g., on-premise or cloud-based) to view, create and update the data. Interactions between the applications and the data are facilitated by metadata which describes the semantics of the data.

For example, the metadata may include database table names, table column names (e.g., Address, Sales) and a schema describing logical relationships between database tables. While metadata allows searching of data based on such names, conventional systems do not provide mechanisms to search for a specific sequence of values of a given column name. Specifically, a user may operate a conventional system to search for specific values in a Sales column but cannot search for a sequence of values such as "10, 5, 35, 245, 214".

Systems are desired to facilitate searching for sequences of values within numerical data. Systems are also desired to enable the searching of sequences within sources of numerical data located in disparate systems and locations within a system landscape. Such systems may advantageously assist in the determination of origin and storage location of particular data, the identification of data assets, the identification of data redundancies, and the understanding of particular data values.

BRIEF DESCRIPTION OF THE DRAWINGS

FIG. 4 is a tabular representation of a portion of a database table according to some embodiments.

FIG. 7 is a tabular representation of a spreadsheet according to some embodiments.

FIGS. 10A and 10B are tabular representations of sorted rows of a spreadsheet according to some embodiments.

DETAILED DESCRIPTION

Figure 1:
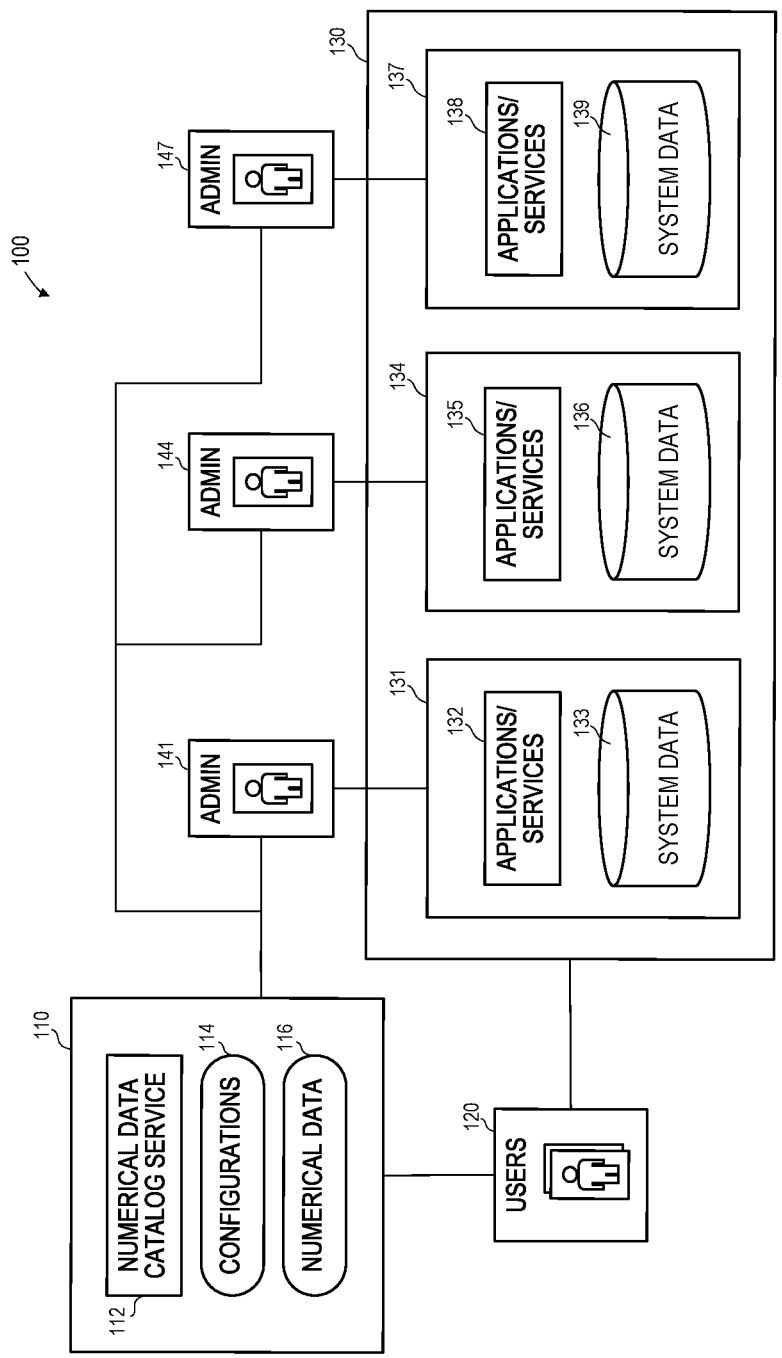
FIG. 1 is a block diagram of an architecture to centrally store and search for numerical data of disparate data sources according to some embodiments.

The following description is provided to enable any person in the art to make and use the described embodiments. Various modifications, however, will remain readily-apparent to those in the art.

Some embodiments provide a numerical data catalog service which maintains centralized information related to numerical data which is stored in various data sources across a system landscape. The catalog service can be used to search the centralized information for a sequence of values which are present within the stored numerical data and to identify the corresponding data source(s). This allows users to determine the origin and storage location of the sequence of values, identify data assets, identify data redundancies, and/or better understand particular data.

Administrators of data sources (e.g., databases) may determine the contents of the searchable catalog. For example, an administrator may define a configuration specifying a connection to a data source, a column of data of the data source, and a number of sequential data values of the column to store in the catalog. If the column represents sequential data, the administrator may specify associated pivot and sort columns.

Once the configuration is defined, the service retrieves the specified number of sequential data values of the column from the data source and stores the values in the catalog. The data values are stored along with information identifying the column and data source. If pivot and sort columns have been specified, the service retrieves and stores sequences of values that correspond to each unique combination of pivot column values, with the order of each stored sequence being determined by the specified sort column(s). The numerical data stored in the catalog may represent and be stored in a data source as non-numerical data, such as ASCII characters which are stored in the catalog using their decimal representations.

The sequences stored in the catalog are searchable by users via a search service exposed by the catalog. In some embodiments, a user provides a sequence of values and the service returns sequences which are stored in the catalog and match the provided sequence, along with associated information identifying the column and data source of each returned sequence. The search results may be ranked based on the degree to which each returned sequence matches the provided sequence.

Embodiments may assist a user in reviewing a file which includes data values. For example, the user may use the search service to identify the data source from which the file was generated, and then access the data source to extract additional information and confirm whether the data of the file was not tampered with. In another example, redundancies may be identified by searching for data value sequences to determine whether those sequences are present in multiple data sources. Embodiments may allow this identification even if the sequences are stored in their data sources using different nomenclature and originate from different master-data.

FIG. 1 is a block diagram of architecture 100 to centrally store and search for numerical data of disparate data sources according to some embodiments. As noted above, the searched-for numerical data may comprise a sequence of numerical values. Architecture 100 is a logical architecture and may be implemented any suitable combination of computing hardware and/or processor-executable program code that is or becomes known. Such combinations may include one or more programmable processors (microprocessors, central processing units, microprocessor cores, execution threads), one or more non-transitory electronic storage media, and processor-executable program code. In some embodiments, two or more elements of architecture 100 are implemented by a single computing device, and/or two or more elements of architecture 100 are co-located. One or more elements of architecture 100 may be implemented as a cloud service (e.g., Software-as-a-Service, Platform-as-a-Service) using cloud-based resources, and/or other systems which apportion computing resources elastically according to demand, need, price, and/or any other metric.

In this regard, server 110 may comprise any suitable monolithic, distributed, on-premise and/or cloud-based computing platform for executing program code of numerical data catalog service 112, receiving requests thereto, and providing corresponding responses. Numerical data catalog service may allow a client application to create configurations 114 and to search numerical data 116 for sequences of data values as described herein. As will be described below, numerical data 116 is acquired and stored by service 112 based on configurations 114.

Users 120 may comprise any persons authorized to search numerical data 116. A user 120 may operate a computing device (e.g., a desktop computer, a laptop computer, a smartphone) to transmit a search request including a sequence of values to service 112. The computing device may transmit the search request by executing an application to call an application programming interface exposed by service 112. In other embodiments, a user 120 may execute a Web browser to access a home page associated with service 112 and input the search request via Web pages provided by service 112. In either of the above examples, the user 120 may provide any credentials required by service 112 for access thereto as is known in the art.

Users 120 may also interact with computing landscape 130 including servers 131, 134 and 137. Embodiments are not limited to three servers. Each of servers 131, 134 and 137 may provide one or more applications and/or services to users 120. Each of users 120 may be authorized to access one or more of the applications and/or services. That is, not all of users 120 are able to access a same subset of the applications and/or services according to some embodiments.

The one or more applications and/or services are associated with corresponding store system data 133, 136 and 139 based on which the applications and/or services provide functionality to users 120. Some of the stored data may be common to two or more of system data 133, 136 and 139 and some may be exclusive to an application and/or service. System data 133, 136 and 139 may be stored in any format suitable for storage of data, including but not limited to database tables and spreadsheet files.

Administrators 141, 144 and 147 respectively administer (e.g., configure, manage) the applications and/or services executing on servers 131, 134 and 137. Embodiments are not limited to this 1-1 relationship, such that any administrator 141, 144 and 147 may administer an application or service executed by any of servers 131, 134 and 137 in some embodiments.

Figure 2:
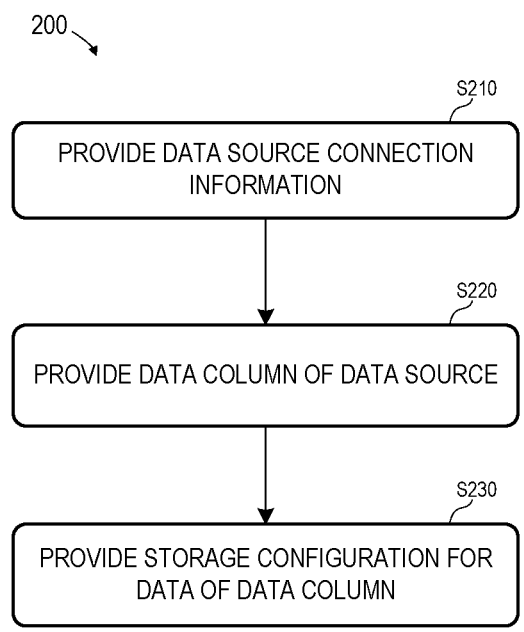
FIG. 2 is a flow diagram of a process to configure storage of numerical data of a data source according to some embodiments.

As described above, one or more of administrators 141, 144 and 147 may determine to provide particular system data of an application or service to service 112 so that the data is searchable by authorized ones of users 120. FIG. 2 illustrates process 200 to configure service 112 to acquire and store such particular system data in a searchable manner. Process 200 and the other processes described herein may be performed using any suitable combination of hardware and software. Software program code embodying these processes may be stored by any non-transitory tangible medium, including a fixed disk, a volatile or non-volatile random access memory, a DVD, a Flash drive, and a magnetic tape, and executed therefrom. Embodiments are not limited to the examples described below.

Initially, at S210, data source connection information is provided. The provided information is usable to access a data source. The data source may comprise any data structure including a data column which is to be rendered searchable as described herein. The data source may, for example, comprise a database (relational or other), a database table, or a spreadsheet file.

Figure 3A:
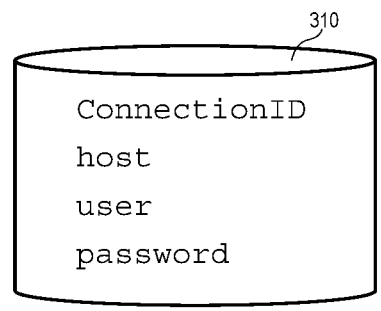
FIGS. 3A and 3B illustrate configuration fields for configuring storage of numerical data of a data source according to some embodiments.

FIG. 3A illustrates fields of data source connection information 310 according to some embodiments. Embodiments are not limited to the fields of FIG. 3A. ConnectionID represents an identifier of the connection, host represents an IP address, filepath, or other location information usable to access a data source, and user and password represent optional credentials which may be required to access the data source. In some embodiments, an administrator accesses a user interface of service 112 to provide the data source connection information at S210, as well as the other information provided during process 200. In other embodiments, an application operated by an administrator to manage the data source may access an API of service 112 to provide the information thereto.

Next, at S220, a data column of the data source is provided. In some embodiments, after the administrator provides data source connection information via a user interface of service 112, service 112 accesses the data source and allows the administrator to browse and select one of the data columns of the data source at S220. The selectable data columns may be limited to those including numerical data in some embodiments. S220 may include providing an identifier of the column used within the data source as well as a description of the column.

A storage configuration for data of the data column is provided at S230. The storage configuration may specify a number of sequential data values of the column to store, and whether the column represents sequential data. If the column represents sequential data, the configuration also includes at least one sort column and zero or more pivot columns.

Figure 3B:
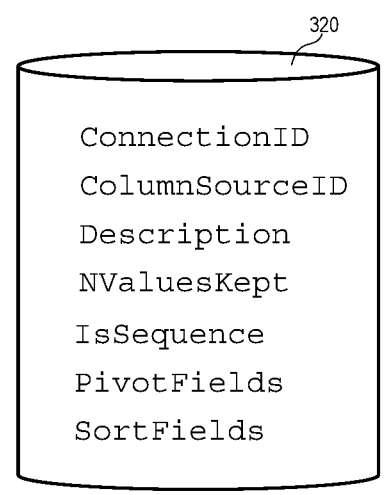

FIG. 3B illustrates fields of data column configuration 320 according to some embodiments. ConnectionID represents an identifier of a previously-defined connection to a data source, ColumnSourceID may represent a column within the data source and Description describes the column data. Accordingly, a single data source connection may be used within multiple data column configurations. NValuesKept indicates a number of values of the column to store in the catalog, IsSequence is a flag indicating if the values are sequential, and PivotFields and SortFields are used to specify what values are stored and in what order as will be described below.

Figure 4:
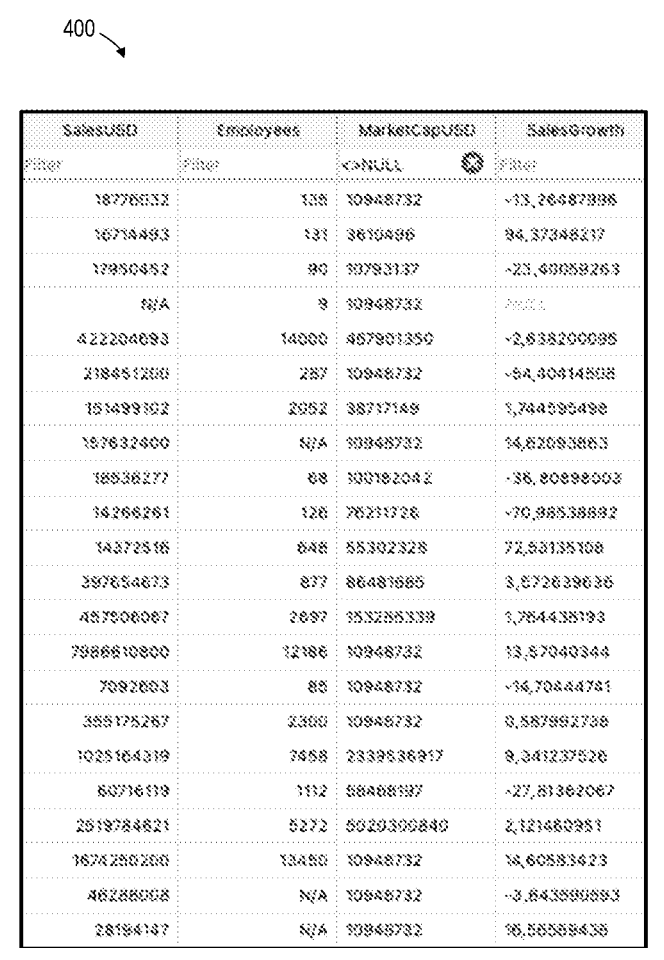
Figure 5:
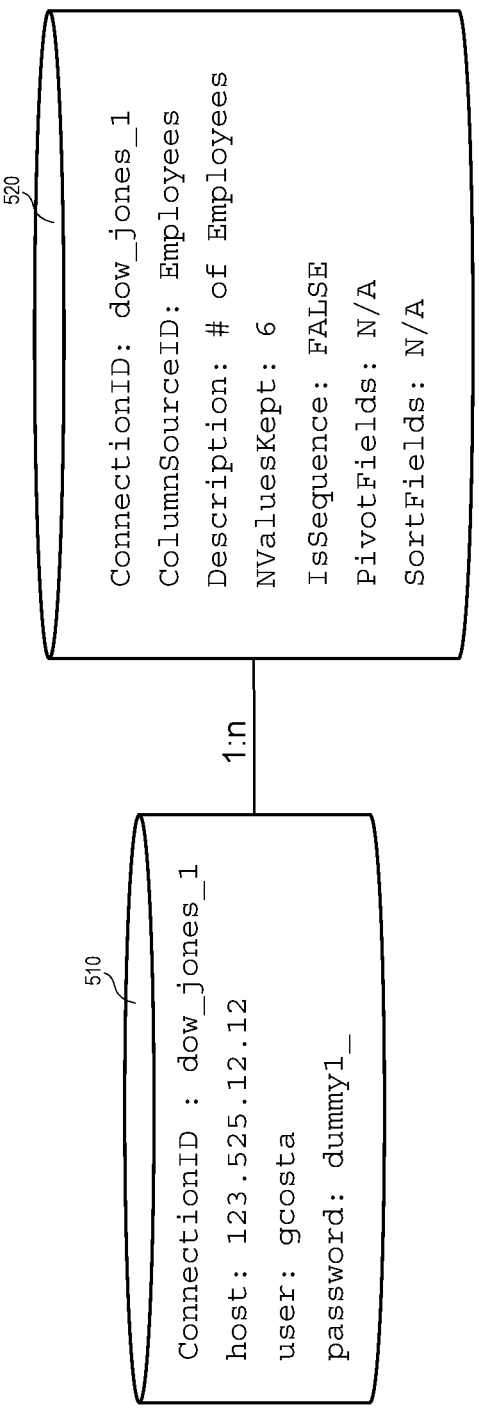
FIG. 5 illustrates a configuration for storing numerical data of a data source according to some embodiments.

FIG. 4 is a tabular representation of a portion of database table 400 according to some embodiments. It will be assumed that an administrator desires to store data of the column Employees within a searchable catalog according to some embodiments. Accordingly, if not already defined, a connection to the data source is specified at S210. FIG. 5 illustrates data source connection information 510 and data column configuration 520 according to the present example.

The data source in this example is a database consisting only of table 400 and may be accessed at host IP address 123.525.12.12. For a multi-table database, the host field may include an IP address for the database and an identifier of a particular table. The connection to database table 400 is denoted "dow_jones_1", and the administrator-provided login credentials are "gcosta" and "dummy1_".

Data column configuration 520 identifies data source connection information 510 and column Employees of the corresponding data source (i.e., table 400). Configuration 520 also provides a semantic description of the column and indicates that 6 values of the column are to be stored in the searchable catalog. In some embodiments, the number of values is an optional field and a default value (e.g., 100) is used during subsequent processing if the field is empty. Configuration 520 further indicates that the data values of the column are not to be treated as a sorted sequence (i.e., IsSequence=False).

As indicated by "1:n" in FIG. 5, data source connection information 510 may be referenced by any number of data column configurations in order to store data of various data columns of the data source. Multiple data column configurations may also or alternatively be used to store data of a same data column based on different sort and/or pivot fields.

Once a data column configuration is defined, a service according to some embodiments may retrieve the specified number M of data values of the column (e.g., from the first M consecutive rows of the column). The data values may be retrieved from the data source using the connection information for the particular data source specified in the data column configuration and stored in the catalog. The data values are stored in the catalog along with information identifying the column and data source.

Figure 6:
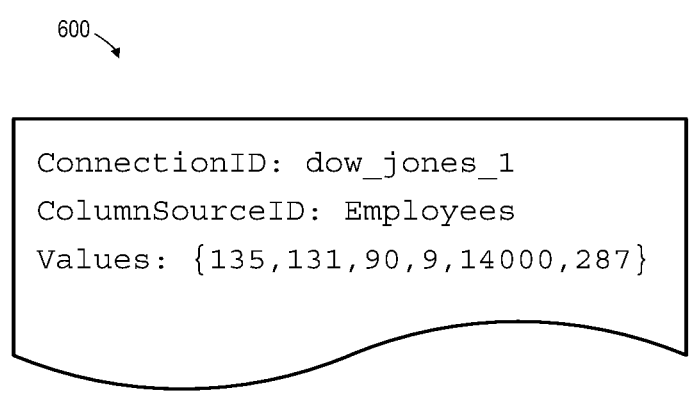
FIG. 6 illustrates a stored sequence of numerical values of a data source according to some embodiments.

FIG. 6 is an example of catalog entry 600 stored in a searchable catalog according to some embodiments. Catalog entry 600 includes values retrieved from database table 400 based on data column configuration 520 and data source connection information 510. Catalog entry 600 may be stored in any suitable format, including but not limited to a row of a database table.

As shown, catalog entry 600 includes the ConnectionID and ColumnSourceID of data column configuration 520. Moreover, entry 600 includes the first 6 values of the column Employees of table 400, per the NValuesKept field of configuration 520. Briefly, a user-initiated search for the values {131, 90, 9} may identify catalog entry 600, in which case the ConnectionID and ColumnSourceID of catalog entry 600 are returned to the user. If login information is specified in the data source connection information of the ConnectionID, this information is also provided to the user. The user may then use the returned information to access the original data source (i.e., table 400) and review data of the Employees column and other columns. In some embodiments, the user is required to access the original data source using his/her own credentials, to prevent unauthorized access to the data source.

Figure 8:
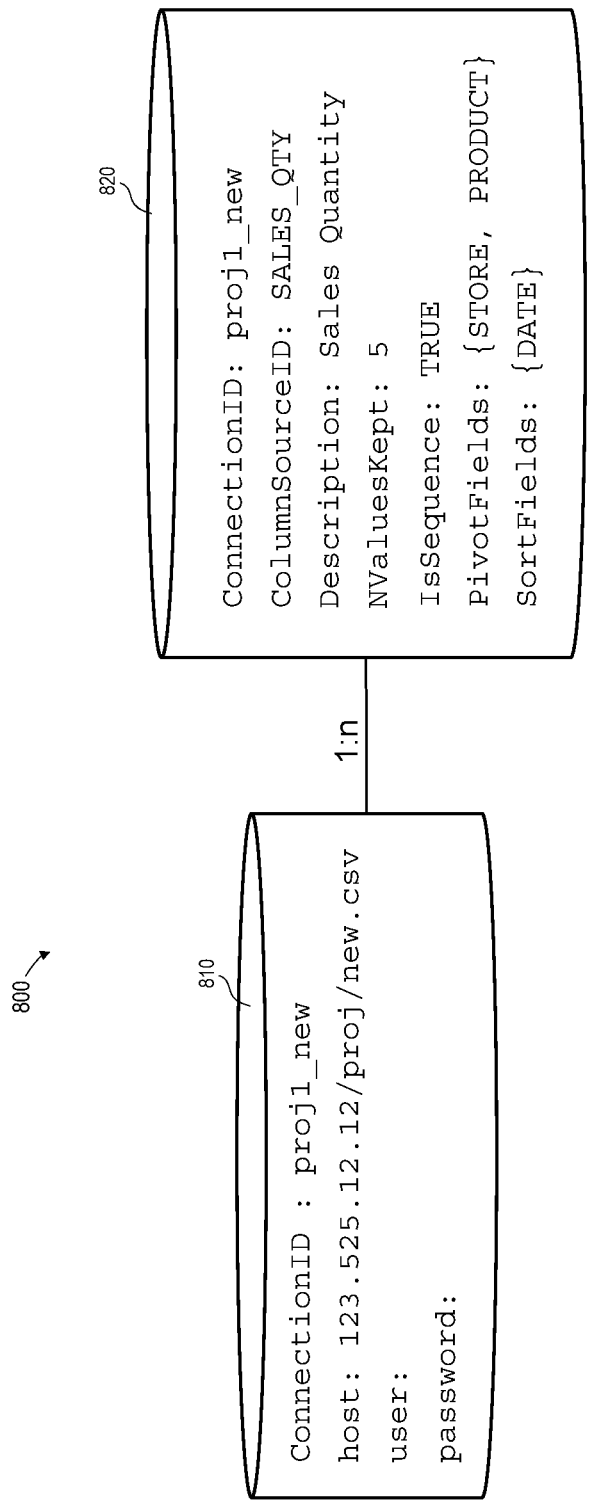
FIG. 8 illustrates a configuration for storing sequential numerical data of a data source according to some embodiments.

Storage of the data values in the catalog proceeds differently in a case that the data column configuration specifies the data as sequential (i.e., IsSequence=True). FIG. 7 is a tabular representation of a portion of spreadsheet 700. For purposes of the present example, it will be assumed that an administrator has created data source connection information 810 of FIG. 8 corresponding to spreadsheet 700. Data column configuration 820 is associated with information 810 (i.e., via ConnectionID proj1_new) and column SALES_QTY of spreadsheet 700. Moreover, configuration 820 specifies that 5 values (i.e., NKeptValues=5) should be stored, that the values are sequential (IsSequence=TRUE), pivot fields STORE and PRODUCT, and sort field DATE.

Figure 9:
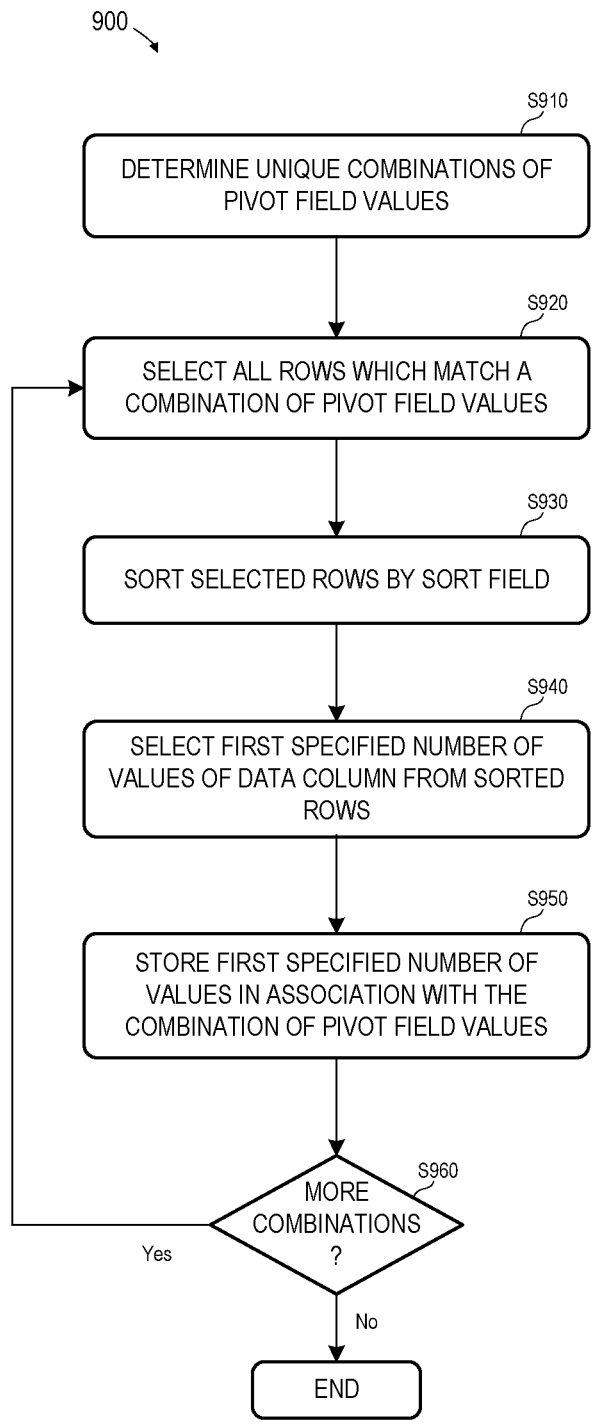
FIG. 9 is a flow diagram of a process to store sequential numerical data of a data source based on a configuration according to some embodiments.

FIG. 9 is a flow diagram of process 900 to store data values in the catalog using specified pivot and sort fields according to some embodiments. Initially, at S910, all unique combinations of the pivot field values are determined. With reference to spreadsheet 700, it is determined at 5910 that the rows include two unique combinations of the values of fields {STORE, PRODUCT}: {2297, 10005} and {2297, 211116}.

Next, all rows which match one of the combinations of pivot field values are selected. The selected rows are sorted according to the sort field at S930. FIG. 10A illustrates rows 1000 of spreadsheet 700 which match the combination {2297, 10005} and are sorted by the DATE field at S930 according to some embodiments.

The number of specified values of the data column are selected from the sorted rows at S940. In the present example, values of the SALES QTY column are selected from the first 5 sorted rows 1000. The selected values (i.e., 1, 4, 0, 8, 8) are stored in association with the corresponding combination of pivot values at S950.

Figure 11:
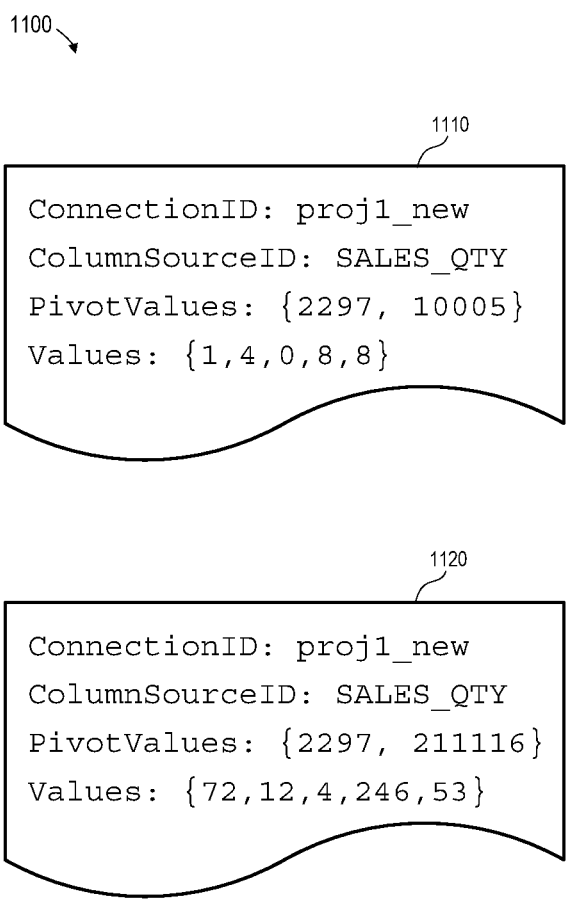
FIG. 11 illustrates stored sequences of numerical values of a data source according to some embodiments.

FIG. 11 shows catalog entry 1110 stored at S950 according to some embodiments. Entry 1110 includes the corresponding ConnectionID and ColumnSourceID, and the sequence of values selected at S950. Catalog entry 1110 also include the values of fields {STORE, PRODUCT} which correspond to the stored sequence.

Since additional combinations of values of fields {STORE, PRODUCT} exist, flow proceeds to S960 and returns to S920 to select all rows which match the next combination of pivot field values {2297, 211116}. The selected rows are sorted based on the sort field at S930. FIG. 10B illustrates rows 1010 of spreadsheet 700 which match the combination {2297, 211116} and are sorted by the DATE field.

The number of specified values of the data column are then selected from sorted rows 1010. The selected values (i.e., 72, 12, 4, 246, 53) are stored in association with the corresponding combination of pivot values at S950 as described above. In this regard, catalog entry 1120 of FIG. 11 includes the same ConnectionID and ColumnSourceID as entry 1110, the sequence of values selected at S950, and the values of fields {STORE, PRODUCT} which correspond to the sequence stored in catalog entry 1120.

Figure 12:
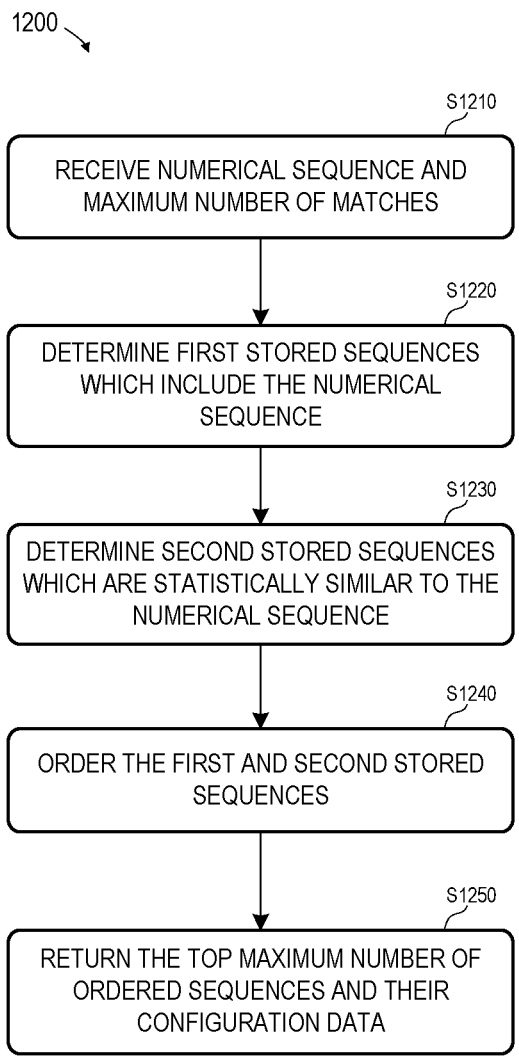
FIG. 12 is a flow diagram of a process to execute a search for a numerical sequence according to some embodiments.

FIG. 12 is a flow diagram of process 1200 to execute a search for stored numerical sequences according to some embodiments. Process 1200 may be implemented by an API of service 112 which receives a numerical sequence and an optional maximum number of values as input. The API may be called by a user from a user interface provided by service 112 or from inside an application or service accessed by the user which is configured to call the API.

The numerical sequence and optional maximum number of matches are received at S1210. At S1220, numerical data 116, which includes the catalog entries described above, is searched to determine first stored sequences which include the numerical sequence. For example, if the received numerical sequence is {12, 4, 246}, the sequence of catalog entry 1120 may be determined as including the received sequence at S1220.

Next, at S1230, second stored sequences are determined which are statistically similar to the numerical sequence. Any one or more statistical measures may be utilized at S1230, as well as any threshold values used to determine whether thusly-measured sequences are "similar". According to some embodiments, "statistical similarity" is determined by applying min-max normalization to the stored sequences and using a known statistical technique (e.g., the Kolmogorov-Smirnov test) for comparing probability distributions. Advantageously, this approach may identify two sequences which differ by a constant multiplying factor (e.g., a currency exchange rate) as being similar.

The first and second stored sequences are ordered at S1240. The ordering may be based on a score associated with each sequence. In some embodiments, a score of 4 stars is assigned to a stored sequence which is identical to the received sequence, 3 stars are assigned to a stored sequence which includes a sub-sequence to which the received sequence is identical, and the sub-sequence occurs at the beginning of the stored sequence, 2 stars are assigned to a stored sequence which includes a sub-sequence to which the received sequence is identical, and 1 star is assigned to a stored sequence which is statistically similar to the received sequence, according to any suitable measure of similarity. Embodiments are not limited to the scores and criteria described above.

The sequences are returned to the user in order at S1250. If a maximum number N was received at S1210, only the top N of the ordered sequences are returned at S1250. Also returned with each sequence may be its corresponding Score. Some embodiments further return PivotValues for each sequence from the corresponding catalog entry of numerical data 116. Moreover, embodiments may return data source connection information and column data configuration information used to acquire and store a sequence. This information may include, for each returned sequence, a ConnectionID, host, ColumnSourceID, and Description.

Figure 13:
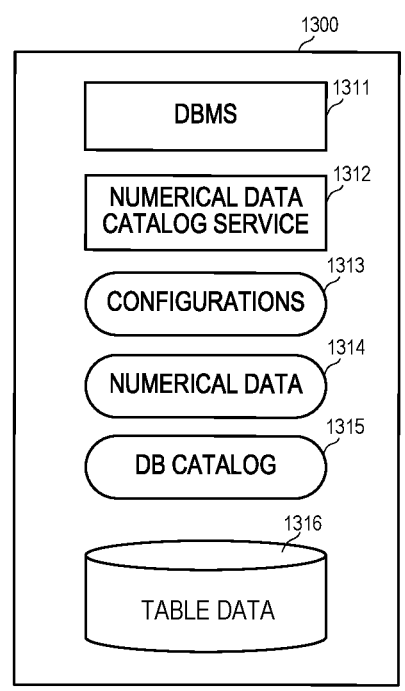
FIG. 13 is a block diagram of a database system providing search of numerical sequences according to some embodiments.

FIG. 13 is a block diagram of database system 1300 according to some embodiments. Database system 1300 may comprise an on-premise or cloud-based database system, and may be a implemented by a single node or distributed nodes. As is known in the art, database system 1300 includes database management system 1311, database catalog 1315 and table data 1316.

Database system 1300 also includes numerical data catalog service 1312, configurations 1313 and numerical data 1314 to facilitate the searching of sequences within table data 1316. Accordingly, database system 1300 may provide client applications with native searching of column data sequences. In this regard, an administrator of database system 1300 may generate configurations 1313 including data source connection information identifying tables within table data 1316 and data column configurations specifying data columns and metadata used to store values thereof in numerical data 1314 as described above.

Figure 14:
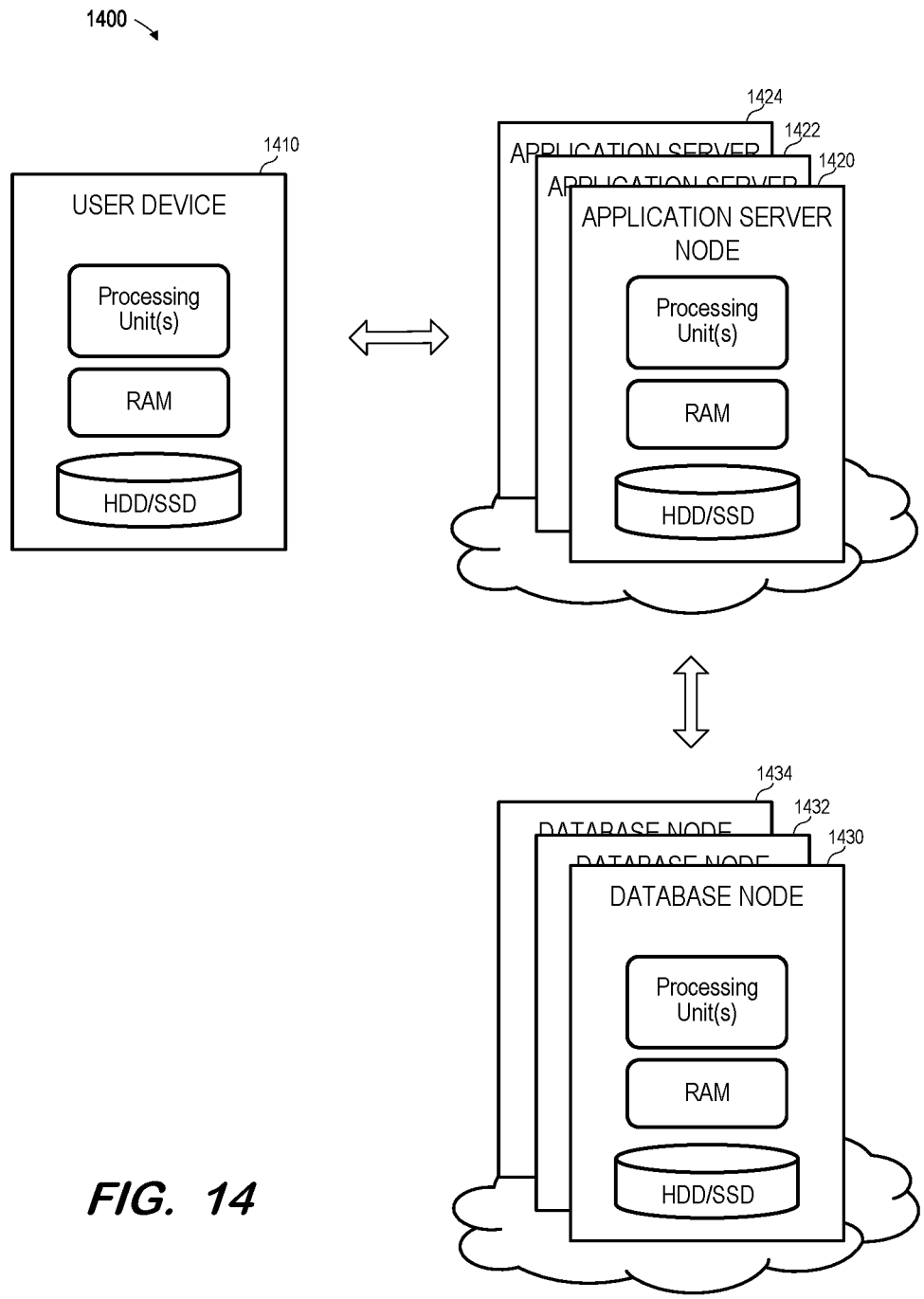
FIG. 14 is a block diagram of a cloud-based architecture implementing a system according to some embodiments.

FIG. 14 is a block diagram of cloud-based system 1400 according to some embodiments. Each of application server nodes 1420, 1422 and 1444 and database nodes 1430, 1432 and 1444 may comprise cloud-based compute resources, such as virtual machines, allocated by a public cloud provider providing self-service and immediate provisioning, autoscaling, security, compliance and identity management features.

A user may operate client device 1410 to interact with user interfaces of a service or application provided by any of application server nodes 1420, 1422 and 1444. Each of these services or applications may operate in conjunction with data stored on one or more of database nodes 1430, 1432 and 1444.

One of application server nodes 1420, 1422 and 1444 may provide a numerical data catalog service as described herein. Administrators of application server nodes 1420, 1422 and 1444 may use the service to generate configurations based on any data source of database nodes 1430, 1432 and 1444. Similarly, a user may operate client device 1410 to submit a search request to the service and to receive one or more stored sequences and corresponding data source information in return.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of architectures described herein may include a programmable processor to execute program code such that the computing device operates as described herein.

All systems and processes discussed herein may be embodied in program code stored on one or more non-transitory computer-readable media. Such media may include, for example, a DVD-ROM, a Flash drive, magnetic tape, and solid-state Random Access Memory (RAM) or Read Only Memory (ROM) storage units. Embodiments are therefore not limited to any specific combination of hardware and software.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Embodiments described herein are solely for the purpose of illustration. Those in the art will recognize other embodiments may be practiced with modifications and alterations to that described above.

What is claimed is:

1. A system comprising:
   a storage device; and
   a processor to execute processor-executable program code stored on the storage device to cause the system to:
      identify a plurality of configurations, each of the plurality of configurations specifying a column of one of a plurality of data sources, where a first column specified by a first configuration is different from a second column specified by a second configuration;
      for each configuration, acquire a sequence of values stored in consecutive rows of the column specified by the configuration;
      store each acquired sequence of values in the storage device in association with an identifier of the data source and an identifier of the column from which the sequence was acquired;

receive a search request including a target sequence of values; and in response to the search request:

identify one of the stored sequences of values as matching the target sequence; and return the identified one of the stored sequences of values and the associated identifier of the data source and identifier of the column from which the identified one of the stored sequences of values was acquired.

2. A system according to claim 1, wherein a first configuration of the plurality of configurations specifies a first column and a sort field of a first data source, and wherein acquisition of a first sequence of values stored in consecutive rows of the first column comprises sorting the first column based on the sort field and acquiring the first sequence of values stored in consecutive rows of the sorted first column.

3. A system according to claim 1, wherein a first configuration of the plurality of configurations specifies a first column, a sort field and one or more pivot fields of a first data source, and wherein acquisition of a first sequence of values stored in consecutive rows of the first column comprises selecting rows of the data source associated with a same combination of values of the one or more pivot fields, sorting the selected rows based on the sort column, and acquiring the first sequence of values stored in consecutive ones of the sorted rows.

4. A computer-implemented method comprising:

identifying a plurality of configurations, each of the plurality of configurations specifying a column of one of a plurality of data sources, where a first column specified by a first configuration is different from a second column specified by a second configuration;

for each configuration, acquiring a sequence of values stored in consecutive rows of the column specified by the configuration;

storing each acquired sequence of values in a storage device in association with an identifier of the data source and an identifier of first column from which the sequence was acquired;

receiving a search request including a target sequence of values; and in response to the search request:

identifying one of the stored sequences of values as matching the target sequence; and returning the identified one of the stored sequences of values and the associated identifier of the column and identifier of the data source from which the sequence was acquired.

5. A method according to claim 4, wherein a first configuration of the plurality of configurations specifies a first column and a sort field of a first data source, and wherein acquisition of a first sequence of values stored in consecutive rows of the first column comprises sorting the first column based on the sort field and acquiring the first sequence of values stored in consecutive rows of the sorted first column.

6. A method according to claim 4, wherein a first configuration of the plurality of configurations specifies a first column, a sort field and one or more pivot fields of a first data source, and wherein acquisition of a first sequence of values stored in consecutive rows of the first column comprises selecting rows of the data source associated with a same combination of values of the one or more pivot fields, sorting the selected rows based on the sort column, and acquiring the first sequence of values stored in consecutive ones of the sorted rows.

7. A non-transitory medium storing processor-executable program code, the program code executable to cause a system to:

identify a plurality of configurations, each of the plurality of configurations specifying a column of one of a plurality of data sources, where a first column specified by a first configuration is different from a second column specified by a second configuration;

for each configuration, acquire a sequence of values stored in consecutive rows of the column specified by the configuration;

store each acquired sequence of values in a storage device in association with an identifier of the data source and the column from which the sequence was acquired;

receive a search request including a target sequence of values; and in response to the search request:

identify one of the stored sequences of values as matching the target sequence; and return the identified one of the stored sequences of values and the associated identifier of the data source and column from which the identified one of the stored sequences of values was acquired.

8. A medium according to claim 7, wherein a first configuration of the plurality of configurations specifies a first column and a sort field of a first data source, and wherein acquisition of the a first sequence of values stored in consecutive rows of the first column comprises sorting the first column based on the sort field and acquiring the first sequence of values stored in consecutive rows of the sorted first column.

9. A medium according to claim 7, wherein a first configuration of the plurality of configurations specifies a first column, a sort field and one or more pivot fields of a first data source, and wherein acquisition of a first sequence of values stored in consecutive rows of the first column comprises selecting rows of the data source associated with a same combination of values of the one or more pivot fields, sorting the selected rows based on the sort column, and acquiring the first sequence of values stored in consecutive ones of the sorted rows.

* * * * *